(12) United States Patent
Deszcz et al.

(10) Patent No.: US 10,130,199 B2
(45) Date of Patent: Nov. 20, 2018

(54) CAKE STACKING SYSTEM

(71) Applicant: WILTON INDUSTRIES, INC., Woodridge, IL (US)

(72) Inventors: Lisa Deszcz, Woodridge, IL (US); Erin Rohler, Woodridge, IL (US); Traci Chapple, Woodridge, IL (US); David Starr, Woodridge, IL (US); Beth Somers, Woodridge, IL (US)

(73) Assignee: WILTON INDUSTRIES, INC., Naperville, IL (US)

( * ) Notice: Subject to any disclaimer, the term of this patent is extended or adjusted under 35 U.S.C. 154(b) by 0 days.

(21) Appl. No.: 15/519,506

(22) PCT Filed: Oct. 16, 2015

(86) PCT No.: PCT/US2015/056105
§ 371 (c)(1),
(2) Date: Apr. 14, 2017

(87) PCT Pub. No.: WO2016/061557
PCT Pub. Date: Apr. 21, 2016

(65) Prior Publication Data
US 2017/0238741 A1 Aug. 24, 2017

Related U.S. Application Data

(60) Provisional application No. 62/064,866, filed on Oct. 16, 2014.

(51) Int. Cl.
*A47G 19/00* (2006.01)
*A47G 19/30* (2006.01)
(Continued)

(52) U.S. Cl.
CPC .............. *A47G 19/30* (2013.01); *A21C 15/00* (2013.01); *A47F 5/01* (2013.01); *A47G 19/00* (2013.01)

(58) Field of Classification Search
CPC ........ A47G 19/00; A47G 23/08; A21C 15/00; A47F 7/0071
See application file for complete search history.

(56) References Cited

U.S. PATENT DOCUMENTS 1,570,651 A 1/1926 Topping et al.
2,178,166 A 10/1939 Enstrom
(Continued)

OTHER PUBLICATIONS

Make-Fabulous-Cakes, "How to Make Tiered Cakes", <http://www.make-fabulous-cakes.com/tiered-cakes.html>, captured Apr. 20, 2014, 5 pages.
(Continued)

*Primary Examiner* — Bradley Duckworth
(74) *Attorney, Agent, or Firm* — Foley & Lardner LLP

(57) ABSTRACT

A cake stacking system for supporting a multi-tiered cake includes a center rod that extends from a bottom of a base tier of the multi-tiered cake to an interior portion of an uppermost tier of the multi-tiered cake, and a plurality of peripheral rods arranged around the center rod, the plurality of peripheral rods disposed in each tier of the multi-tiered cake except for the uppermost tier of the multi-tiered cake. The center rod includes at least one first rod having a first height and one second rod having a second height. The first height is greater than the second height. Each peripheral rod includes a tubular member and a flange coupled to one end of the tubular member. The flange maintains a vertical position of the tubular member and supports a bottom surface of an above tier of the multi-tiered cake.

18 Claims, 9 Drawing Sheets

(51) Int. Cl.
*A47F 5/01* (2006.01)
*A21C 15/00* (2006.01)

(56) References Cited

U.S. PATENT DOCUMENTS

| | | | |
|---|---|---|---|
| 2,902,174 | A | 9/1959 | Audsley |
| 2,921,691 | A | 1/1960 | Dembinski |
| 3,070,236 | A | 12/1962 | MacPherson, Sr. |
| 3,169,496 | A | 2/1965 | Muggli et al. |
| 3,690,610 | A | 9/1972 | Peirce |
| 3,814,032 | A | 6/1974 | McMains |
| 4,069,772 | A | 1/1978 | Haapala |
| 4,101,232 | A * | 7/1978 | Haapala ............... A21C 15/002 403/197 |
| D278,676 | S | 5/1985 | Deare |
| 4,676,005 | A * | 6/1987 | Seligman ............... A21C 15/00 33/1 F |
| 5,165,637 | A * | 11/1992 | Polley ............... A21C 15/00 108/101 |
| D357,160 | S | 4/1995 | Fritze |
| D362,787 | S | 10/1995 | Burke |
| 5,617,798 | A | 4/1997 | Lytell |
| 5,715,954 | A | 2/1998 | Zaremba |
| 6,123,206 | A | 9/2000 | Zaremba |
| 6,367,759 | B1 | 4/2002 | Simon |
| 8,196,879 | B2 | 6/2012 | Vezina et al. |
| 8,276,524 | B2 | 10/2012 | Goode et al. |
| 8,490,553 | B1 | 7/2013 | English et al. |
| D760,548 | S * | 7/2016 | Deszcz ............... D7/610 |
| 2008/0087617 | A1 | 4/2008 | Harris |
| 2010/0330240 | A1 | 12/2010 | Jeffery |
| 2013/0136829 | A1 | 5/2013 | Kandel |

OTHER PUBLICATIONS

Smith, Shannon, "The New Cake Construction System: Stacked Cakes Driven to Success!" (Wilton Blog—Ideas from Wilton), <http://blog.wilton.com/index.php/new-cake-construction-system-stacked-cakes-driven-success/>, May 8, 2015, 11 pages, Wilton Industries.

Marek, Elizabeth, "Using Straws for Cake Supports", <http://artisancakecompany.com/2013/08/using-straws-for-cake-supports/>, Aug. 6, 2013, 11 pages, Artisan Cake Company.

International Search Report and Written Opinion for Application No. PCT/US2015/065105, dated Jan. 5, 2016, 8 pages.

U.S. Notice of Allowance for U.S. Appl. No. 29/506,545, dated Mar. 28, 2016, 8 pages.

Extended European Search Report in EP 15850707.9, dated Apr. 30, 2018, 10 pages.

* cited by examiner

… (US 10,130,199 B2)

CAKE STACKING SYSTEM

CROSS-REFERENCE TO RELATED APPLICATIONS

This application claims the benefit of U.S. Provisional Application No. 62/064,866, filed on Oct. 16, 2014, which is hereby incorporated by reference in its entirety.

FIELD OF THE INVENTION

The present invention relates generally to the field of supports for building tiered cakes. More specifically, the present invention relates to a cake stacking system and method for supporting and displaying a multi-tiered cake including a plurality of straws and a center rod inserted into a cake during stacking to help support the weight of the tier below, as well as to keep all stacked tiers connected for transportation.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In order to support and display a multi-tiered cake, three categories of support system may be used: 1) dowels/straws, 2) plates/pillars and 3) cake stackers. A combination of the three categories can also be used.

Dowels/Straws

Dowel rods are inserted into the lower tiers of a cake, and bear the weight of the tiers above. Dowel rods and straws may include wooden/bamboo dowel rods, plastic poly-dowels, bubble-tea straws and regular drinking straws. Both wooden and plastic types offer food-safe support. For a stacked cake, using cardboard cake boards between the tiers, wooden dowel rods are utilized by sharpening the dowel rod into a point and driving the dowel rod through the cardboard cake board to secure tiers together. Wooden dowel rods are cut easily and cleanly using wire cutters, sharp shears or a small saw. They are economical and strong.

While some cake stacking systems only use wooden dowel rods, other cake stacking systems use wooden dowel rods reinforced with the strategic placement of plastic dowel rods or straws. Plastic dowel rods or straws are generally wider in diameter and offer greater stability and more support per dowel rod or straw. Therefore, fewer dowel rods or straws are needed. Plastic dowel rods or straws are easy to cut to size with a serrated knife. However, plastic dowel rods or straws take up more cake space, and therefore, have an effect on the number of servings per tier.

Each level of a tiered cake needs dowel rods or straws for support. Tiers that are directly stacked on each other with no separation by plates and pillars are generally further stabilized with an additional center dowel rod to prevent shifting. A center dowel rod includes one sharpened end. In one embodiment, the center dowel rod is pushed through all tiers and cake boards to the base of the bottom tier. In another embodiment, the center dowel rod is slightly shorter than a height of two tiers of the cake. If there are three or more tiers without separation by plates and pillars, a sharpened dowel rod is used through the first two tiers and another sharpened dowel rod is used through the second and third tiers.

Plates/Pillars

Another support system uses a plurality of pillars of fixed length and separator plates fitted with pre-formed mounting sockets for the pillars. Each tier of a cake is placed on a separator plate, which is typically 2 inches larger in diameter than the tier of the cake. A separator plate having a diameter that is the same size as the separator plate of the tier above is placed onto the tier below. Pillars are positioned over the mounting sockets on the separator plate. The tier above is placed on top of the pillars, with the mounting sockets of the separator plate of the tier above being aligned with the tops of the pillars below.

Cake Stackers

Another support system is a cake stacker system that generally includes a base plate having a central rod secured thereto, for example, by screws and spacers. A support plate having peripheral rods secured thereto, for example, by screws and spacers, is lowered onto the central rod and rests upon the tier below. The peripheral rods extend from the support plate into the tier below. A cake stacker system may be made, for example, of metal.

A need exists for improved technology, including technology that may address the above described disadvantages. In particular, a need exists for improved technology that facilitates supporting and displaying a multi-tiered cake, and keeps the tiers of the multi-tiered cake secured together without affecting the appearance of a top tier of the multi-tiered cake.

SUMMARY

One embodiment of the invention relates to a cake stacking system configured to support a multi-tiered cake. The cake stacking system includes a center rod configured to extend from a bottom of a base tier of the multi-tiered cake to an interior portion of an uppermost tier of the multi-tiered cake, and a plurality of peripheral rods arranged around the center rod, the plurality of peripheral rods disposed in each tier of the multi-tiered cake except for the uppermost tier of the multi-tiered cake. The center rod includes at least one first rod having a first height and one second rod having a second height. The first height is greater than the second height. Each peripheral rod comprises a tubular member and a flange coupled to one end of the tubular member, the flange configured to maintain a vertical position of the tubular member and to support a bottom surface of an above tier of the multi-tiered cake.

An additional embodiment of the invention relates to a center rod of a cake stacking system. The center rod includes at least one first rod having a first height, and one second rod having a second height. The first height is greater than the second height. A first rod is coupled to the second rod in an assembled state of the center rod. In the assembled state, the center rod is configured to extend from a bottom of a base tier of the multi-tiered cake to an interior portion of an uppermost tier of the multi-tiered cake.

Another embodiment of the invention relates to a peripheral rod of a cake stacking system. The peripheral rod includes a tubular member, and a flange configured to be coupled to one end of the tubular member. The flange is configured to maintain a vertical position of the tubular member and to support a bottom surface of an above tier of the multi-tiered cake.

Yet another embodiment of the invention relates to a method of assembling a cake stacking system configured to support a multi-tiered cake. The method includes cutting a plurality of tubular members to be a same height as a tier of the multi-tiered cake, assembling a plurality of peripheral rods by coupling a flange to one end of each of the plurality of tubular members, inserting the plurality of peripheral rods into the tier, repeating the cutting, assembling and inserting steps for each additional tier of the multi-tiered cake except for an uppermost tier, positioning and centering an above tier on a base tier for each of the tiers of the multi-tiered cake, assembling a modular center rod comprising at least one first rod having a first height and one second rod having a second height, the first height being greater than the second height, and inserting the center rod in a center of the multi-tiered cake such that the center rod extends from a bottom of a lowermost tier of the multi-tiered cake to an interior portion of the uppermost tier of the multi-tiered cake without affecting an appearance of the upper surface of the uppermost tier.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
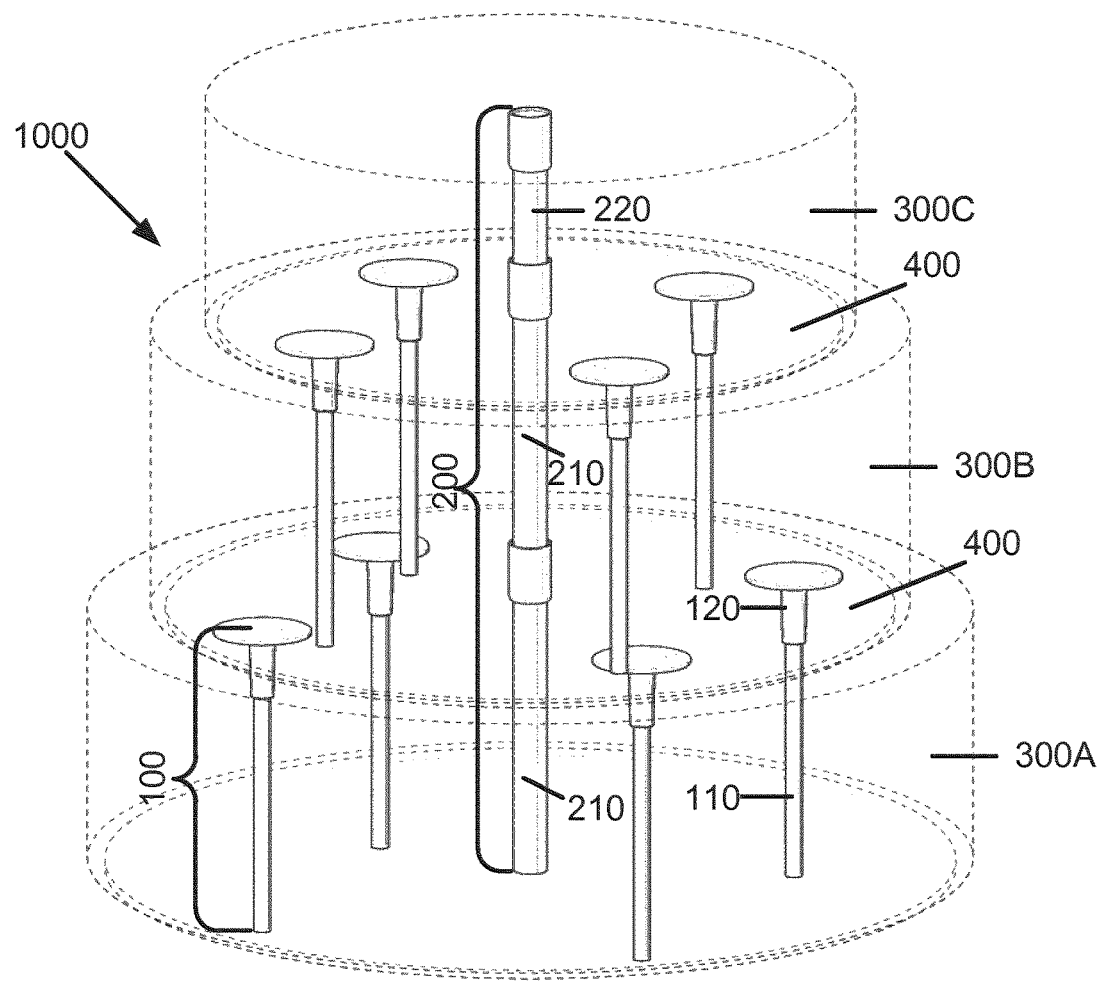
FIG. 1 is a perspective view of a cake stacking system configured to support and display a multi-tiered cake.
Figure 2:
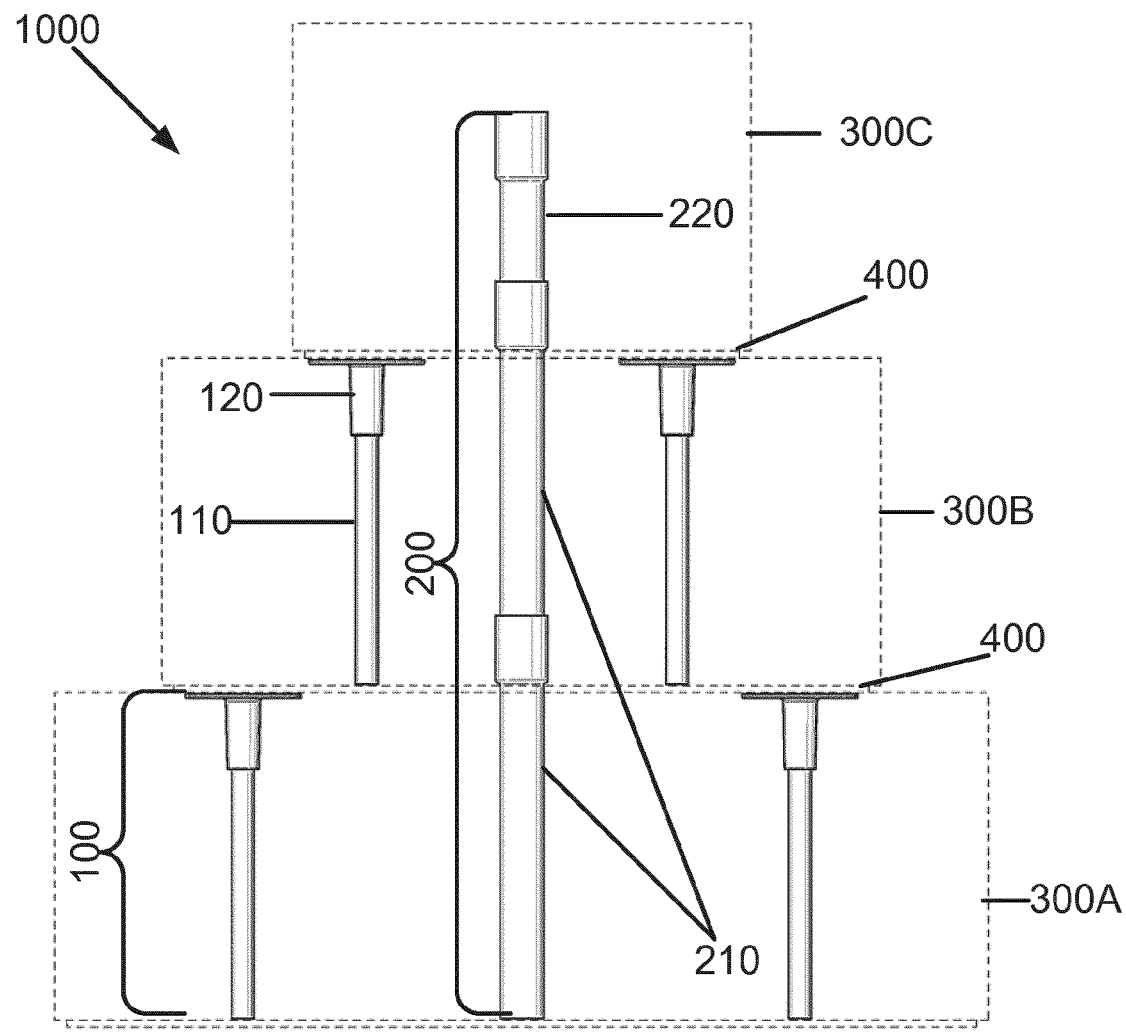
FIG. 2 is a side view of the cake stacking system of FIG. 1.
Figure 3:
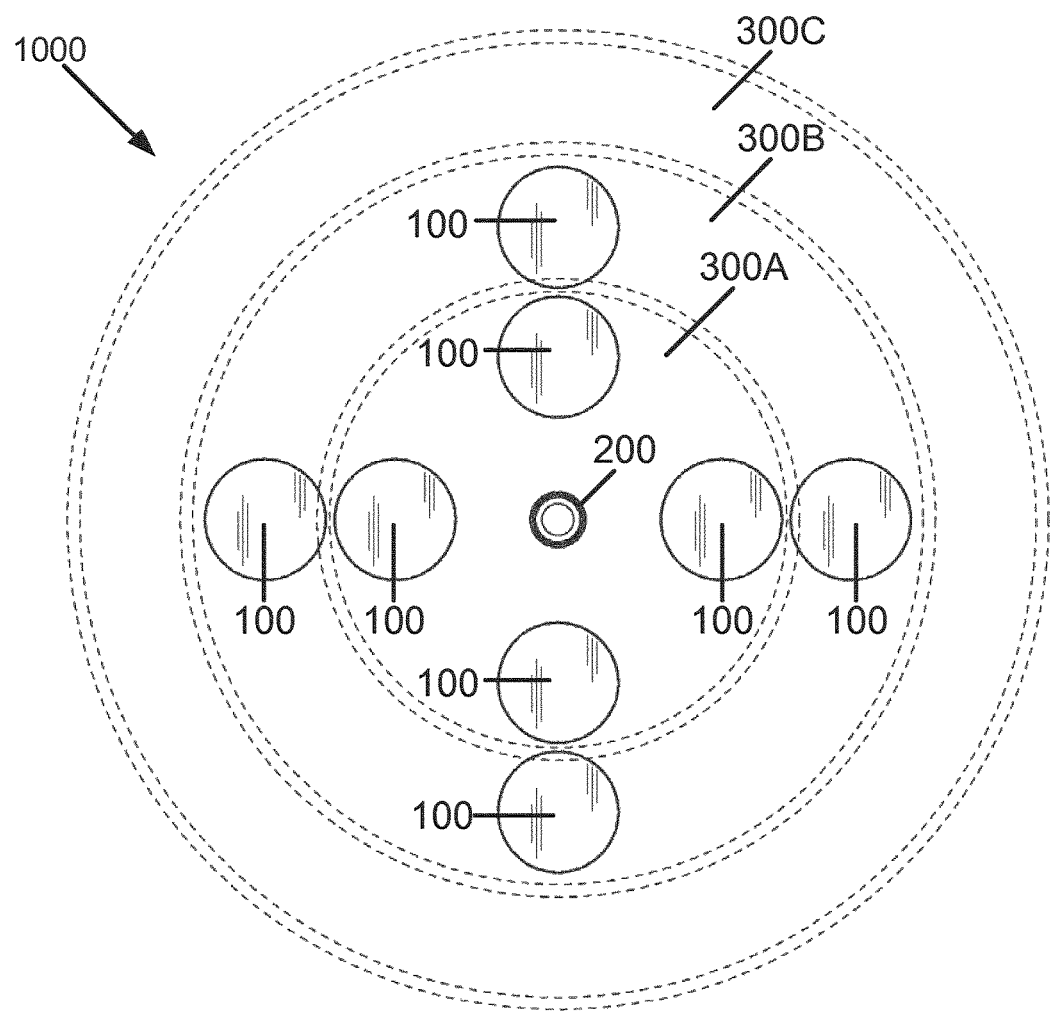
FIG. 3 is a top view of the cake stacking system of FIG. 1.
Figure 4:
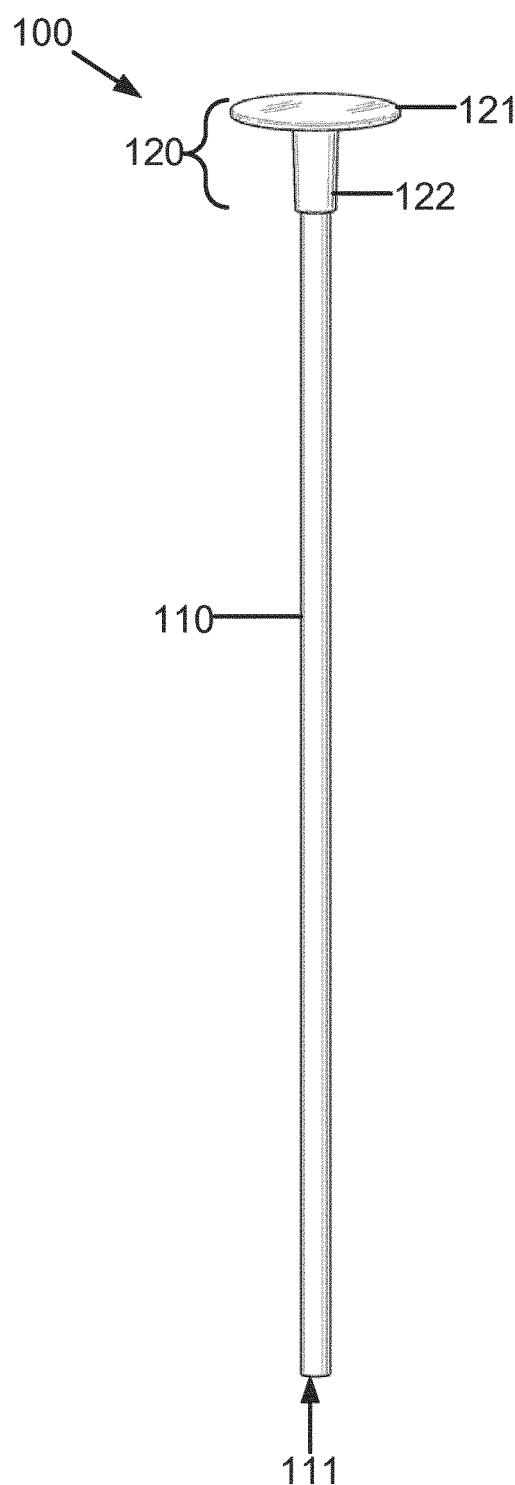
FIG. 4 illustrates a perspective view of a peripheral rod of the cake stacking system of FIG. 1, the peripheral rod including a tubular member and a flange.
Figure 5:
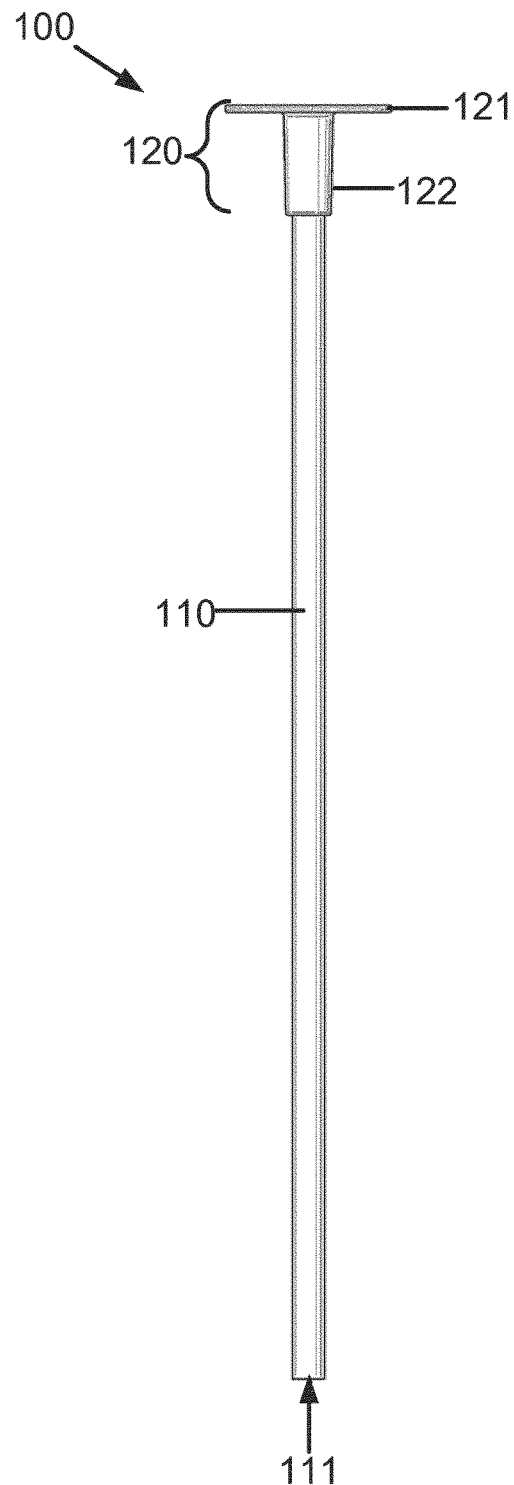
FIG. 5 illustrates a side view of the peripheral rod of FIG. 4.
Figure 6:
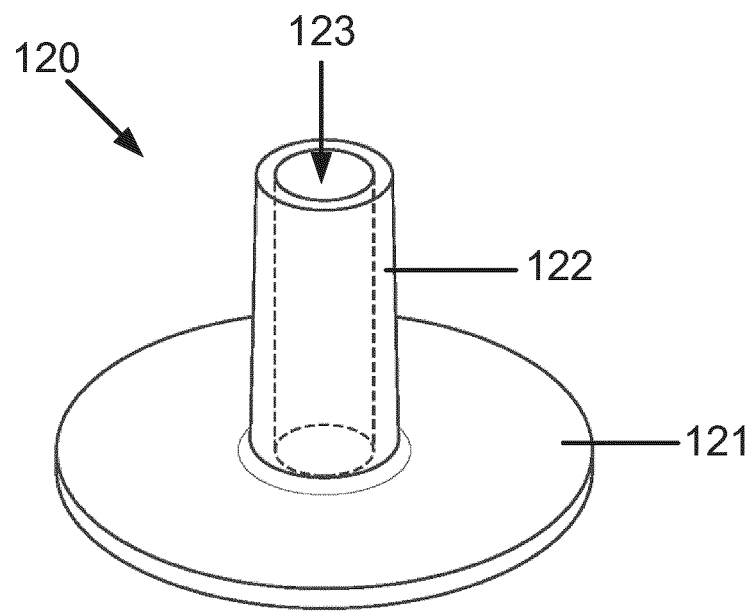
FIG. 6 illustrates a perspective view of the flange of FIG. 4.
Figure 7:
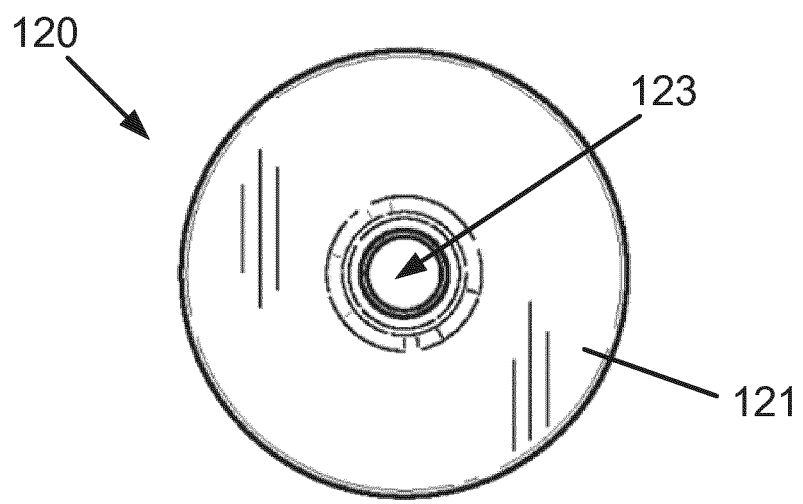
FIG. 7 illustrates a top view of the flange of FIG. 4.

Referring to FIGS. 1-3, a cake stacking system 1000 includes a plurality of peripheral rods 100 arranged around a center rod 200 to support a multi-tiered cake. In the embodiment of FIGS. 1-3, the multi-tiered cake has three tiers 300A, 300B, 300C arranged in vertical alignment with tier 300A being the lowermost tier and tier 300C being the uppermost tier. Although the embodiment of FIGS. 1-3 illustrate a multi-tiered cake having three tiers, the cake stacking system 1000 can be used to support and display a cake having any number of tiers equal to or greater than two tiers, for example, two tiers, three tiers or four tiers. One of ordinary skill in the art would appreciate that the number of peripheral rods 100 and the distance between adjacent peripheral rods used to support each tier would be adjusted depending on the number of tiers and overall weight of the cake.

Referring to FIGS. 4-7, a peripheral rod 100 includes a tubular member 110 and a flange 120. The tubular member 110 is removably and reversibly coupled to the flange 120. The flange 120 is configured to receive the tubular member 110, and keep the tubular member 110 in a standing, vertical position perpendicular to the base of the multi-tiered cake.

In some embodiments, the tubular member 110 is solid, while in other embodiments, the tubular member 110 is hollow. In embodiments in which the tubular member 110 is hollow, the tubular member 110 includes an aperture 111 that extends from one end of the tubular member 110 to another end of the tubular member 110 to define the hollow interior of the tubular member 110. The tubular member 110 may be made, for example, of wood (e.g., bamboo), metal or plastic. In one embodiment, the tubular member 110 is a dowel rod. In a preferred embodiment, the tubular member 110 is a plastic straw (e.g., a regular drinking straw or a bubble tea straw). The tubular member 110 may be made from any other suitable material.

The tubular member 110 can have any suitable height (i.e., length). For example, the tubular member 110 can have a height ranging from 1 inch to 12 inches. In one embodiment, the tubular member 110 has a height of 4 inches, which is the height of a typical tier in a multi-tiered cake. A height of the tubular member 110 may also be adjustable. For example, in the embodiments in which the tubular member 110 is a plastic straw, the height of the tubular member 110 can easily be adjusted, for example, by cutting the tubular member 110 with scissors. The tubular member 110 can have any suitable diameter, provided the diameter of an outer surface of the tubular member 110 is capable of fitting within an aperture 123 of the flange 120 without substantially deforming or otherwise damaging the tubular member 110. For example, the tubular member 110 may fit within the aperture 123 of the flange 120 via an interference fit.

The flange 120 includes a flat base 121 and a projection 122 that protrudes in a direction perpendicular to the base 121. The base 121 and the projection 122 are integrally formed.

The base 121 is solid. Although the base 121 is circular in the embodiment of FIGS. 1-7, in other embodiments, the base 121 may have any shape, for example, a square, a rectangle, a triangle, an oval, a polygon, or a heart. A diameter of the base 121 (or width in embodiments in which the base 121 is not circular) can be any suitable diameter.

One of ordinary skill in the art would appreciate, however, that additional supports may be required as the diameter is made smaller.

Figure 8:
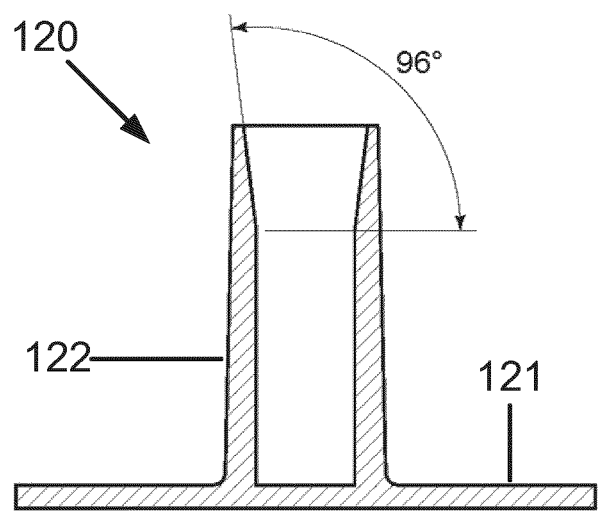
FIG. 8 illustrates a cross-sectional view of the flange of FIG. 4.
Figure 9:
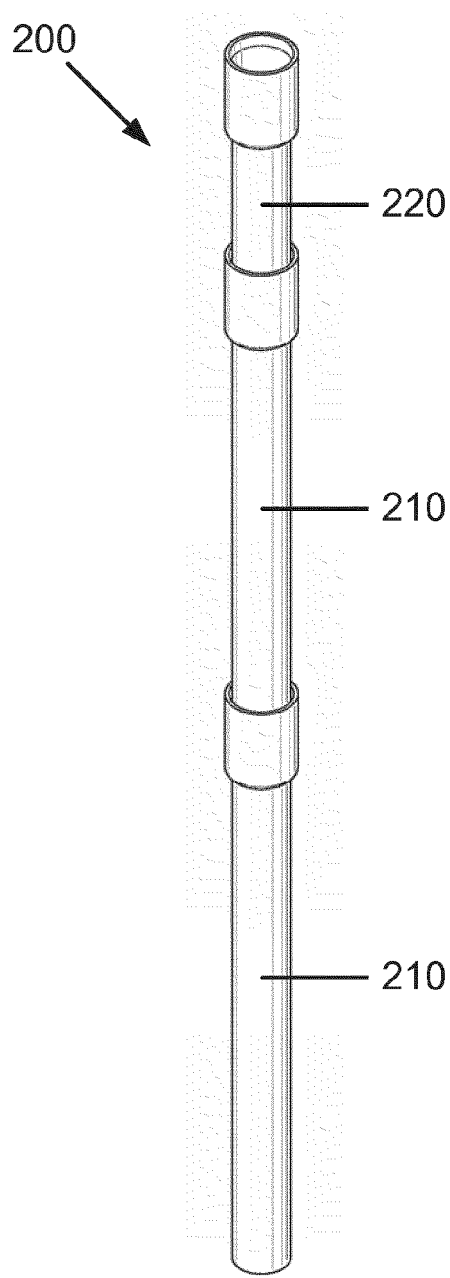
FIG. 9 illustrates a perspective view of a center rod of the cake stacking system of FIG. 1, the center rod including two rods having a first length and a third rod having a second length in an assembled state
Figure 10:
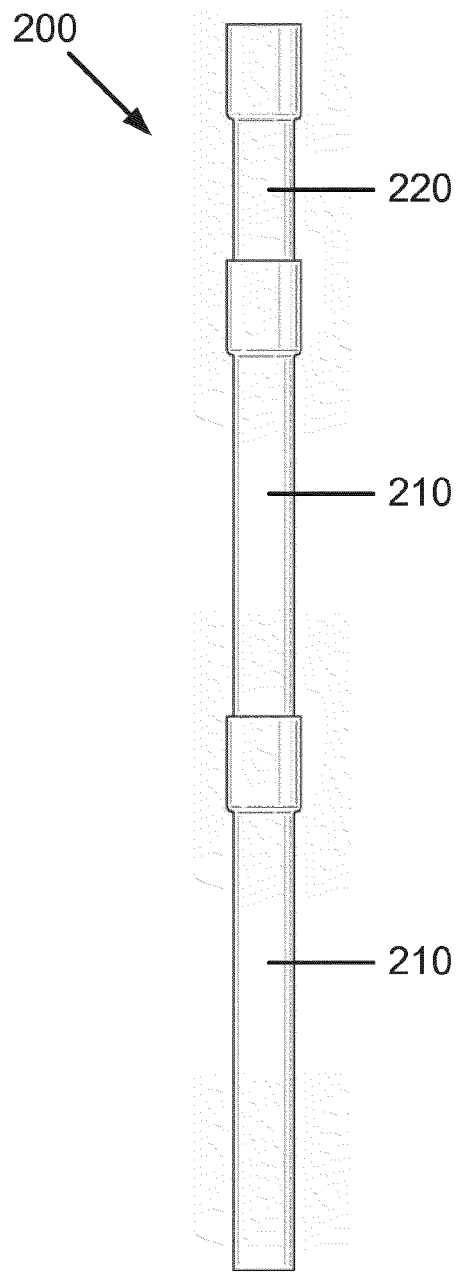
FIG. 10 illustrates a side view of the center rod of FIG. 9.
Figure 12:
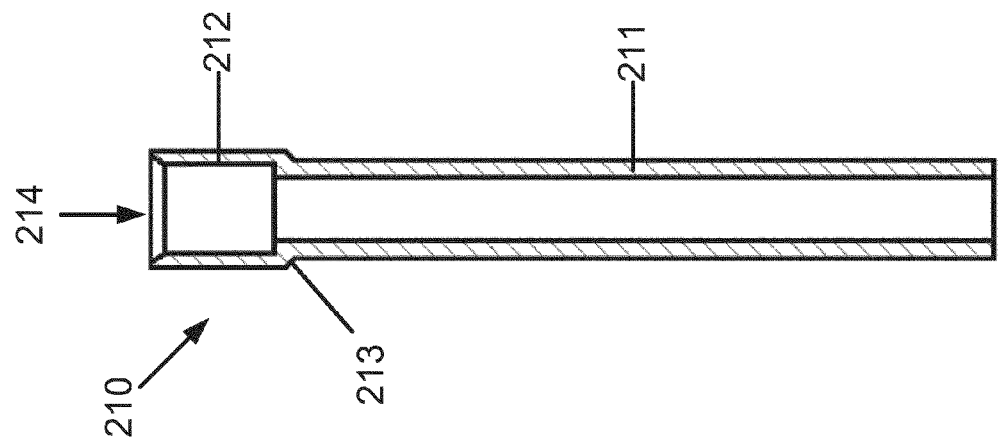
FIG. 12 illustrates a cross-sectional view of the rod of FIG. 11.
Figure 11:
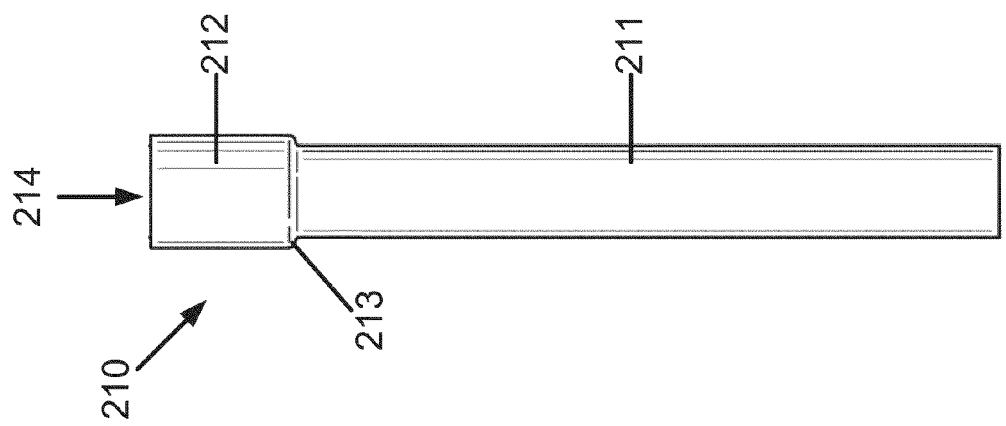
FIG. 11 illustrates a side view of one of the rods having the first length of FIG. 9.
Figure 14:
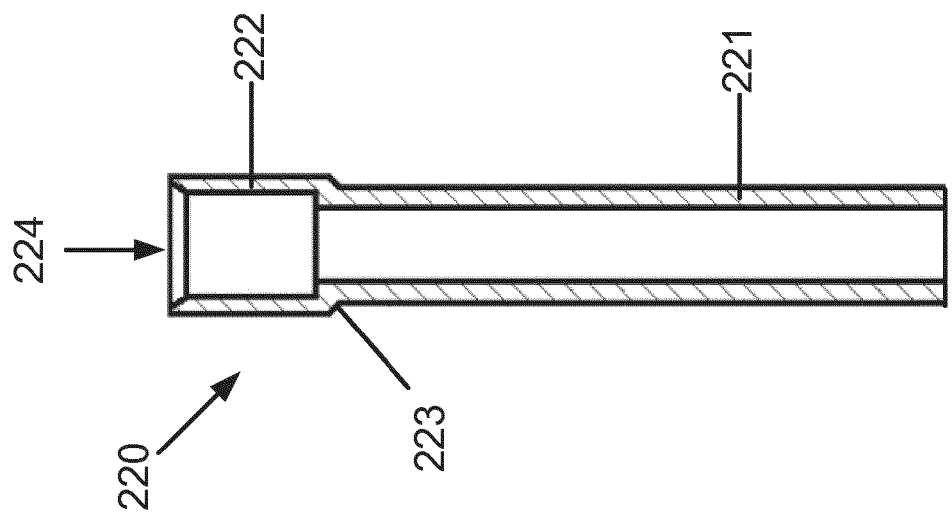
FIG. 14 illustrates a cross-sectional view of the rod of FIG. 13.
Figure 13:
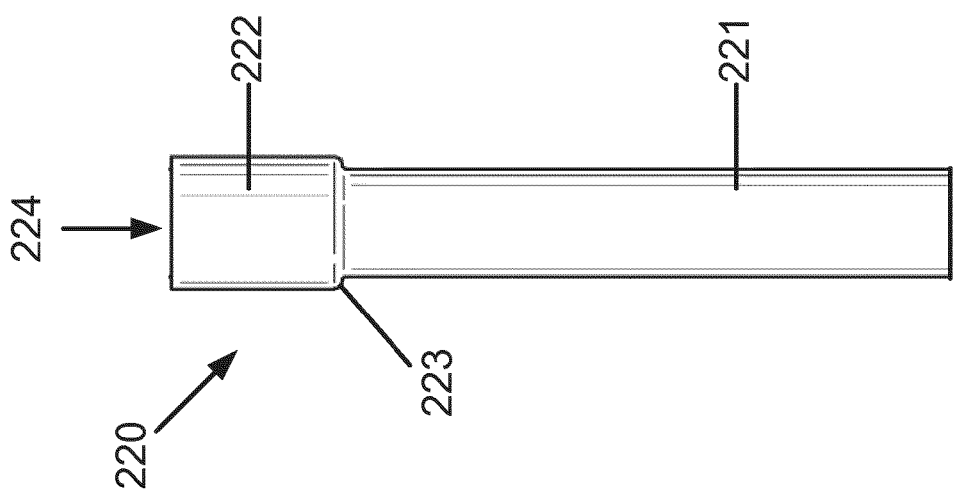
FIG. 13 illustrates a side view of the third rod having the second length of FIG. 9.

The projection 122 is hollow and includes an aperture 123 extending from an end of the projection 122 furthest away from the base 121 to the base 121 to define the hollow interior of the projection. A diameter of an interior of the aperture 123 can be any suitable diameter, provided the projection 122 is capable of receiving the tubular member 110 via an interference fit, without substantially deforming or otherwise damaging the tubular member 110. In one embodiment, as seen in FIG. 8, a thickness of the projection 122 at the end of the projection 122 furthest away from the base 121 is less than a thickness of the projection in portions proximate to the base 121. In other words, an interior surface of the projection 122 may be tapered at the end of the projection 122 furthest away from the base 121. For example, an angle between an interior surface of the projection 122 at the end of the projection 122 furthest away from the base 121 and a horizontal line, parallel to the base 121 may be 96 degrees. See FIG. 8. The tapered interior surface of the projection 122 may facilitate receipt of the tubular member 110 in the flange 120 (i.e., the tapered interior surface of the projection 122 may help the user feed the tubular member 110 into the flange 120). The tapered interior surface of the projection 122 may also assist in securing the tubular member 110 in the flange 120, for example, by a tight, friction fit.

The flange 120 (i.e., the base 121 and the projection 122) may be made, for example, of wood (e.g., bamboo), metal or plastic. In a preferred embodiment, the flange 120 is made from plastic. In some embodiments, the flange 120 may be made of the same material as the tubular member 110. In other embodiments, the flange 120 may be made from a different material than the tubular member 110. The peripheral rods 100 are not present in the uppermost tier of the cake (e.g., tier 300C).

Referring now to FIGS. 9-14, the center rod 200 includes at least one first rod 210 having a first height and one second rod 220 having a second height, where the first height is greater than the second height. For example, the first rod 210 may have a height of four inches, while the second rod 220 may have a height of two inches. The first rods 210 and the second rod 220 are modular. Each first rod 210 can be removably and reversibly coupled to another first rod 210 or to the second rod 220.

Each first rod 210 includes an elongated portion 211 having a first diameter relative to an exterior surface of the elongated portion 211, an end portion 212 having a second diameter relative to an interior surface of the end portion 212, and a tapered portion 213 connecting the elongated portion 211 and the end portion 212. The first rod 210 includes an aperture 214 extending from the end portion 212 to an end of the elongated portion 211 furthest away from the end portion 212 (i.e., from one end of the first rod to the other end of the first rod 210), thereby defining a hollow interior of the first rod 210.

The first rods 210 are configured to be stacked on top of one another until a desired height is achieved. The second diameter is greater than the first diameter such that the elongated portion 211 of one first rod 210 can be received within the end portion 212 of another first rod 210. In one embodiment, the elongated portion 211 of one first rod 210 and the end portion 212 of another first rod 210 are configured to fit together via an interference fit. In another embodiment (not illustrated), an interior surface of the end portion 212 of one first rod 210 includes threads configured to thread together with threads on an exterior surface of the end portion 212 of another first rod 210. Any other suitable means of coupling the plurality of first rods 210 may be utilized.

Each of the first rods 210 are configured to extend between adjacent layers of the multi-tiered cake. For example, as seen in FIGS. 1 and 2, the elongated portion 211 of a first rod 210 extends along an entire height of the tier 300A, while the end portion 212 of the first rod 210 rests on a surface of cake board 400 supporting the tier 300B, which is directly above the tier 300A. The elongated portion 211 of another first rod 210 is received within the end portion 212 of the first rod 210 and extends along an entire height of the tier 300B, while the end portion 212 of the other first rod 210 rests on a surface of cake board 400 supporting the tier 300C, which is directly above the tier 300B.

The second rod 220 includes an elongated portion 221 having a first diameter relative to an exterior surface of the elongated portion 221, an end portion 222 having a second diameter relative to an interior surface of the end portion 222, and a tapered portion 223 connecting the elongated portion 221 and the end portion 222. The second rod 220 includes an aperture 224 extending from the end portion 222 to an end of the elongated portion 221 furthest away from the end portion 222 (i.e., from one end of the second rod 220 to the other end of the second rod 220), thereby defining a hollow interior of the second rod 220. The second rod 220 is configured to extend along a partial height of the uppermost tier (e.g., tier 300C in the embodiment of FIGS. 1 and 2) of the cake. The second rod 220 does not extend all the way through the top of the uppermost tier of the cake, so no clean-up is needed from the user.

The first diameter of the second rod 220 is smaller than the second diameter of the first rod 210 such that the elongated portion 221 of the second rod 220 can be received within the end portion 212 of the uppermost first rod 210. In other words, each first rod 210 is configured to removably and reversibly couple to either another first rod 210 or to the second rod 220. Only one second rod 220 is used in the cake stacking system 1000, so a height of the center rod 200 is adjusted by stacking a plurality of first rods 210. In one embodiment, the elongated portion 221 of the second rod 220 and the end portion 212 of the uppermost first rod 210 are configured to fit together via an interference fit. In another embodiment (not illustrated), an interior surface of the end portion 212 of the uppermost first rod 210 includes threads configured to thread together with threads on an exterior surface of the end portion 222 of the second rod 220. Any other suitable means of coupling the uppermost first rod 210 and the second rod 220 may be utilized.

The center rod 200 (i.e., the plurality of first rods 210 and the second rod 220) may be made, for example, of wood (e.g., bamboo), metal or plastic. In some embodiments, the center rod 200 is made from the same material as the peripheral rods 100. In other embodiments, the center rod 200 is made from a different material than the peripheral rods 100. The center rod does not need to be sharpened as a dowel rod would, and does not affect the appearance of the uppermost tier of the cake (i.e., the top of the cake) like inserting a dowel rod affects the appearance of the uppermost tier of the cake.

The peripheral rods 100 and/or the center rod 200 may be opaque or transparent. In addition, the peripheral rods 100 and/or the center rod 200 may be any color or design.

A method of assembling the cake stacking system 1000 will now be described. A cake board 400 having a same size as the tier above it (e.g., tier 300B) is centered on a base tier (e.g., tier 300A) and pressed gently into icing to imprint an outline of the cake board 400 on the base tier 300A. The cake board 400 is removed and the outline is used to guide insertion of the peripheral rods 100. A tubular member 110 is inserted into the tier 300A straight down to the cake board 400 on which the tier 300A is supported. A mark is made on the tubular member 110, for example, by making a knife scratch on the tubular member 110) to mark an exact height of the tier 300A. The tubular member 110 is pulled out. The user then cuts the suggested number of tubular members 110 to the exact same length, using the mark on the tubular member 110 that was inserted into the tier 300A as a guide. For example, if the tubular member 110 is a plastic straw, the tubular member 110 may be cut with scissors. If the tubular member 110 is a plastic dowel rod, the tubular member 110 may be cut with a serrated knife. If the tubular member 110 is a wooden dowel rod, the tubular member 110 may be cut using wire cutters, sharp shears or a small saw. The suggested number of tubular members 110 may be determined, for example, by dividing a diameter of the cake tier in half. For example, if the cake tier has an 8-inch diameter, the suggested number of tubular members 110 is 4, equally spaced tubular members 110. In another example, if the cake tier has a 12-inch diameter, the suggested number of tubular members 110 is 6, equally spaced tubular members 110.

A flange 120 is placed on one end of each cut tubular member 110 (i.e., an assembled state of the peripheral rod 100) such that the end of the tubular member 110 contacts the base 121 of the flange 120. The assembled peripheral rods 100 are inserted into the tier 300A such that the base 121 of the flange 120 is aligned in a same plane with an upper surface of the tier 300A and the end of the tubular member 110 that is not coupled to the flange 120 contacts the cake board 400 at the bottom of the tier 300A. This procedure is repeated for every tier of the cake (e.g., tier 300B), except for the uppermost tier of the cake (e.g., tier 300C).

The middle tier 300B is then positioned on the base tier 300A and centered exactly. Finely shredded coconut or confectioner's sugar may be placed in an area on the surface of the base tier 300A where the cake board 400 of the middle tier 300B will rest to help prevent icing on the cake from sticking.

An assembled center rod 200 (i.e., the plurality of first rods 210 and the second rod 220) is inserted into the cake, according to the method described below. The cake stacking system 1000 ensures that all tiers 300A-300C stay secured together.

Each cake board 400 for any cake tiers above the base tier 300A (e.g., tiers 300B and 300C) are provided with a hole in a center of the cake board 400. The hole can be pre-cut by a manufacturer of the cake board 400, or the hole can be cut into the cake board 400 by the user. The base tier 300A is placed on a study cake base. The first rod 210 is inserted into the base tier 300A from above. A height of the first rod 210 is selected such that approximately one inch of the first rod 210 is exposed after the first rod 210 is inserted into the base tier 300A. An additional first rod 210 is placed into the exposed portion of the first rod 210 that is already inserted in the base tier 300A. The middle tier 300B is placed on its respective cake board 400. The middle tier 300B and the cake board 400 on which it was placed are placed over the additional first rod 210 such that the hole in the cake board 400 is aligned with the first rod 210, and fed down until the cake board 400 contacts the top of the base tier 300A. Once again, the height of the first rod 210 were selected such that about 1 inch of the additional first rod 210 is exposed once the middle tier 300B is fed all the way down. Additional first rods 210 and tiers 300 can be added to the cake stacking system in the same manner, depending on the desired number of cake tiers 300. When the user is ready to add the uppermost tier 300C, the second rod 220 is placed into the exposed portion of the uppermost first rod 210. The uppermost tier 300C and the cake board 400 on which it was placed are placed over the second rod 220 such that the hole in the cake board 400 is aligned with the second rod 220, and fed down until the cake board 400 contacts the top of the cake tier 300 immediately below the uppermost tier 300C. Because the second rod 220 is shorter than the first rod 210, and its height is selected such that the height of the second rod 220 is less than the height of the uppermost tier 300C, no portion of the second rod 220 will be exposed when the uppermost tier 300C is resting on the cake tier immediately below it.

According to the method described above, each first rod 210 is coupled to at least one additional first rod 210, with the uppermost first rod 210 being coupled at one end to the second rod 220. Additional first rods 210 may be coupled to the first rod 210 inserted in the base tier 300A until a desired height is reached.

The assembled center rod 200 is configured to stabilize the cake tiers 300 from lateral movement. In one embodiment, the center rod 200 (i.e., the lowermost first rod 210) may be secured at a bottom to the cake plate on which the base tier 300A rests. For example, the user may be able to fasten the center rod 200 to the cake plate of the base tier 300A via an interference fit with a hole in the cake plate, a snap fit with a hole in the cake plate, or threads on an exterior surface of the first rod 210 that are configured to thread together with threads in a hole in the cake plate. Any other suitable means for coupling the center rod 200 to the cake plate of the base tier 300A may be utilized.

The construction and arrangements of the cake stacking system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A cake stacking system configured to support a multi-tiered cake, comprising:
    a center rod configured to extend from a bottom of a base tier of the multi-tiered cake to an interior portion of an uppermost tier of the multi-tiered cake; and
    a plurality of peripheral rods arranged around the center rod, the plurality of peripheral rods disposed in each tier of the multi-tiered cake except for the uppermost tier of the multi-tiered cake,
    wherein the center rod comprises at least one first rod having a first height and one second rod having a second height, the first height being greater than the second height,
    wherein a first rod is directly coupled to the second rod in an assembled state of the center rod, and
    wherein each peripheral rod comprises a tubular member and a flange coupled to one end of the tubular member, the flange configured to maintain a vertical position of the tubular member and to support a bottom surface of an above tier of the multi-tiered cake.

2. The cake stacking system of claim 1, wherein the tubular member is a plastic straw.

3. The cake stacking system of claim 1, wherein
    the at least one first rod of includes an elongated portion having a first diameter, and an end portion having a second diameter greater than the first diameter, and
    the end portion of the at least one first rod is configured to receive the second rod.

4. The cake stacking system of claim 3, wherein
    the at least one first rod further includes a tapered portion connecting the elongated portion and the end portion.

5. The cake stacking system of claim 1, wherein
    the second rod includes an elongated portion having a first diameter, and an end portion having a second diameter greater than the first diameter, and
    the elongated portion of the second rod is configured to be inserted in a portion of the at least one first rod.

6. The cake stacking system of claim 5, wherein
    the second rod further includes a tapered portion connecting the elongated portion and the end portion.

7. The cake stacking system of claim 1, wherein
    the flange includes a base and a hollow projection that protrudes in a direction perpendicular to the base,
    the base and the projection are integrally formed, and
    the projection is configured to receive the one end of the tubular member therein.

8. The cake stacking system of claim 7, wherein
    an interior surface of the projection is tapered.

9. A center rod of a cake stacking system configured to support a multi-tiered cake, comprising:
    at least one first rod having a first height; and
    one second rod having a second height, the first height being greater than the second height, wherein
    a first rod is directly coupled to the second rod in an assembled state of the center rod,
    in the assembled state, the center rod is configured to extend from a bottom of a base tier of the multi-tiered cake to an interior portion of an uppermost tier of the multi-tiered cake,
    the at least one first rod includes an elongated portion having a first diameter, and an end portion having a second diameter greater than the first diameter, and
    the end portion of the at least one first rod is configured to receive the second rod.

10. The center rod of claim 9, wherein in the assembled state, an additional first rod is directly coupled to the first rod at an end of the first rod that is not coupled to the second rod.

11. The center rod of claim 9, wherein
    the at least one first rod further includes a tapered portion connecting the elongated portion and the end portion.

12. The center rod of claim 9, wherein
    the second rod includes an elongated portion having a third diameter, and an end portion having a fourth diameter greater than the third diameter, and
    the elongated portion of the second rod is configured to be inserted in the end portion of the at least one first rod.

13. The center rod of claim 12, wherein
    the second rod further includes a tapered portion connecting the elongated portion of the second rod and the end portion of the second rod.

14. A peripheral rod of a cake stacking system configured to support a multi-tiered cake, comprising:
    a tubular member; and
    a flange configured to be directly coupled to one end of the tubular member, wherein
    the flange is configured to maintain a vertical position of the tubular member and to support a bottom surface of an above tier of the multi-tiered cake,
    the flange includes a base and a hollow projection that protrudes in a direction perpendicular to the base,
    the base and the projection are integrally formed, and
    the projection is configured to receive the one end of the tubular member therein.

15. The peripheral rod of claim 14, wherein the tubular member is a plastic straw.

16. The peripheral rod of claim 14, wherein an interior surface of the projection is tapered.

17. A method of assembling a cake stacking system configured to support a multi-tiered cake, the method comprising:
    cutting a plurality of tubular members to be a same height as a tier of the multi-tiered cake;
    assembling a plurality of peripheral rods by directly coupling a flange to one end of each of the plurality of tubular members;
    inserting the plurality of peripheral rods into the tier;

repeating the cutting, assembling and inserting steps for each additional tier of the multi-tiered cake except for an uppermost tier;

positioning and centering an above tier on a base tier for each of the tiers of the multi-tiered cake;

assembling a modular center rod comprising at least one first rod having a first height and one second rod having a second height, the first height being greater than the second height, wherein assembling the center rod comprises directly coupling the first rod to the second rod;

inserting the center rod in a center of the multi-tiered cake such that the center rod extends from a bottom of a lowermost tier of the multi-tiered cake to an interior portion of the uppermost tier of the multi-tiered cake without affecting an appearance of the upper surface of the uppermost tier.

18. The method of claim 17, wherein the plurality of tubular members comprise plastic straws.

* * * * *